US009688184B2

(12) United States Patent
Kataike

(10) Patent No.: US 9,688,184 B2
(45) Date of Patent: Jun. 27, 2017

(54) VEHICLE LAMP SYSTEM

(71) Applicant: KOITO MANUFACTURING CO., LTD., Tokyo (JP)

(72) Inventor: Yusuke Kataike, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/958,075

(22) Filed: Dec. 3, 2015

(65) Prior Publication Data

US 2016/0159272 A1 Jun. 9, 2016

(30) Foreign Application Priority Data

Dec. 4, 2014 (JP) .................................. 2014-245716

(51) Int. Cl.
| H05B 33/08 | (2006.01) |
| B60Q 1/14 | (2006.01) |
| B60Q 1/12 | (2006.01) |
| F21S 8/10 | (2006.01) |

(52) U.S. Cl.
CPC .............. B60Q 1/143 (2013.01); B60Q 1/12 (2013.01); F21S 48/1154 (2013.01); F21S 48/125 (2013.01); F21S 48/1747 (2013.01); B60Q 2300/056 (2013.01); B60Q 2300/112 (2013.01)

(58) Field of Classification Search
USPC ... 315/77, 82, 83, 88, 89, 90, 119, 121, 122, 315/123, 185 R, 192, 193, 291, 294, 297, 315/307, 312, 313, 362
See application file for complete search history.

(56) References Cited

U.S. PATENT DOCUMENTS

2005/0275562 A1* 12/2005 Watanabe .............. B60Q 1/085
340/933

FOREIGN PATENT DOCUMENTS

| EP | 2567867 A2 | 3/2013 |
| JP | 201354993 A | 3/2013 |

* cited by examiner

*Primary Examiner* — Douglas W Owens
*Assistant Examiner* — Jianzi Chen
(74) *Attorney, Agent, or Firm* — Sughrue Mion, PLLC

(57) ABSTRACT

In a midst of switching light distribution patterns from a first light distribution pattern to a second light distribution pattern, in the event that a situation is detected in which the first light distribution pattern needs to be switched to a third light distribution pattern which differs from the second light distribution pattern, and in switching from the second light distribution pattern to the third light distribution pattern, in the event that in a plurality of partial areas which make up the third light distribution pattern, there exist a plurality of switching partial areas where an upward trend in illuminance changes to a downward trend, a control unit of a vehicle lamp system controls the drive of semiconductor light emitting devices which illuminate the plurality of switching partial areas so that the switching to the third light distribution pattern can be executed within a predetermined length of time.

9 Claims, 10 Drawing Sheets

VEHICLE LAMP SYSTEM

CROSS-REFERENCE TO RELATED APPLICATION

The present application claims the benefit of priority of Japanese Patent Application No. 2014-245716, filed on Dec. 4, 2014, which is incorporated herein by reference.

TECHNICAL FIELD

The present invention relates to a vehicle lamp system which forms light distribution patterns according to situations occurring ahead of a vehicle or driving conditions of the vehicle.

BACKGROUND ART

Conventionally, there has been proposed a vehicle headlamp which uses a light source having a plurality of semiconductor light emitting devices which are aligned (JP-A-2013-54993). This vehicle headlamp is configured to form light distribution patterns which illuminate predetermined ranges ahead of the vehicle. The light distribution patterns are each made up of a collection of a plurality of partial areas. The partial areas are illuminated by the corresponding semiconductor light emitting devices when they are illuminated or turned on. Thus, the plurality of semiconductor light emitting devices are individually controlled so as to be turned on or off to form various light distribution patterns. In this configuration, for example, in case a preceding vehicle is detected in one partial area of the plurality of partial areas, the semiconductor light emitting device which corresponds to that particular partial area can be turned off so that the partial area can be put in an unilluminated state to thereby restrict the driver of the preceding vehicle from being dazzled.

Incidentally, in the event that the partial areas of a light distribution pattern are illuminated or unilluminated, a certain length of switching time becomes necessary to illuminate the semiconductor light emitting device to target brightness or turn off the devices or dim them. Although there are various ways of changing the brightness, it is one of ideas to be taken to change the brightness by a constant ratio at all times because the switching control of light distribution patterns and the drive circuit configuration of light emitting devices can be simplified.

However, in the event that the brightness of a plurality of areas is changed individually according to situations, depending upon the brightness of the semiconductor light emitting devices before the change or target brightness to which the semiconductor light emitting devices are illuminated, the time required for the individual areas to reach their target brightness (the switching time) differs. Because of this, depending upon situations where light distribution patterns are changed, the driver may feel the sensation of physical disorder.

SUMMARY OF THE INVENTION

The present invention has been made in view of these situations, and an object thereof is to provide a technique to restrict the driver from feeling the sensation of physical disorder in switching light distribution patterns.

According to an aspect of the present invention, there is provided a vehicle lamp system including a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle, and a control unit configured to control the plurality of semiconductor light emitting devices so as to change their luminous intensities based on information obtained on forward situations or information obtained on a driving condition of the subject vehicle to thereby realize a plurality of light distribution patterns. In a midst of switching the plurality of light distribution patterns from a first light distribution pattern to a second light distribution pattern which are both included in the plurality of light distribution patterns, in the event that a situation is detected in which the first light distribution pattern needs to be switched to a third light distribution pattern which differs from the second light distribution pattern, and in switching from the second light distribution pattern to the third light distribution pattern, in the event that in the plurality of partial areas which make up the third light distribution pattern, there exist a plurality of switching partial areas where an upward trend in illuminance changes to a downward trend, the control unit controls the drive of the semiconductor light emitting devices which illuminate the plurality of switching partial areas so that the switching to the third light distribution pattern can be executed within a predetermined length of time T1. When used herein, the light distribution patterns include not only an instance where some of the partial areas differ in brightness but also an instance where all the partial areas are identical in brightness. In addition, there may be a case where the first light distribution pattern is the same as the third light distribution pattern.

According to this aspect of the present invention, even in the event that there exist a plurality of switching partial areas where an upward trend in illuminance changes to a downward trend, the switching to the third light distribution pattern is executed within the predetermined length of time T1. Because of this, for example, even in the event that in the plurality of switching partial areas, the illuminance is changed at different timings, the timings at which the illuminance is changed in the switching partial areas can be arranged to line up with each other. The light distribution patterns include an instance where all the partial areas are not illuminated.

Another aspect of the present invention also relates to a vehicle lamp system. This lamp system includes a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle, and a control unit configured to control the plurality of semiconductor light emitting devices so as to change their luminous intensities based on information obtained on forward situations or information obtained on a driving condition of the subject vehicle to thereby realize a plurality of light distribution patterns. In midst of switching the plurality of light distribution patterns from a fourth light distribution pattern to a fifth light distribution pattern which are both included in the plurality of light distribution patterns, in the event that a situation is detected in which the fourth light distribution pattern needs to be switched to a sixth light distribution pattern which differs from the fifth light distribution pattern, and in switching from the fifth light distribution pattern to the sixth light distribution pattern, in the event that in the plurality of partial areas which make up the sixth light distribution pattern, there exist a plurality of switching partial areas where a downward trend in illuminance changes to an upward trend, the control unit controls the drive of the semiconductor light emitting devices which illuminate the plurality of switching partial areas so that the switching to the sixth light distribution pattern can be executed within a predetermined length of time T2. There may be a case where the fourth light distribution pattern is the same as the sixth light distribution pattern.

According to this aspect of the present invention, even in the event that there exist a plurality of switching partial areas where a downward trend in illuminance changes to an upward trend, the switching to the sixth light distribution pattern is executed within the predetermined length of time T2. Because of this, for example, even in the event that in the plurality of switching partial areas, the illuminance is changed at different timings, the timings at which the illuminance is changed in the switching partial areas can be arranged to line up with each other.

A further aspect of the present invention also relates to a vehicle lamp system. This lamp system includes a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle, and a control unit configured to control the plurality of semiconductor light emitting devices so as to change their luminous intensities based on information obtained on forward situations or information obtained on a driving condition of the subject vehicle to thereby realize a plurality of light distribution patterns. (1) In a midst of switching the plurality of light distribution patterns from a first light distribution pattern to a second light distribution pattern which are both included in the plurality of light distribution patterns, in the event that a situation is detected in which the first light distribution pattern needs to be switched to a third light distribution pattern which differs from the second light distribution pattern, and in switching from the second light distribution pattern to the third light distribution pattern, in the event that in the plurality of partial areas which make up the third light distribution pattern, there exist a plurality of switching partial areas where an upward trend in illuminance changes to a downward trend, the control unit controls the drive of the semiconductor light emitting devices which illuminate the plurality of switching partial areas so that the switching to the third light distribution pattern can be executed within a predetermined length of time T1, and (2) in a midst of switching the plurality of light distribution patterns from a fourth light distribution pattern to a fifth light distribution pattern which are both included in the plurality of light distribution patterns, in the event that a situation is detected in which the fourth light distribution pattern needs to be switched to a sixth light distribution pattern which differs from the fifth light distribution pattern, and in switching from the fifth light distribution pattern to the sixth light distribution pattern, in the event that in the plurality of partial areas which make up the sixth light distribution pattern, there exist a plurality of switching partial areas where a downward trend in illuminance changes to an upward trend, the control unit controls the drive of the semiconductor light emitting devices which illuminate the plurality of switching partial areas so that the switching to the sixth light distribution pattern can be executed within a predetermined length of time T2 (T2>T1).

According to this aspect, for example, in the event that in the switching partial areas, the upward trend in illuminance is changed to the downward trend so as to suppress the glare, the light distribution patterns can be switched relatively quickly. On the other hand, in the event that the illuminance is increased to enhance the visibility, the illuminance is changed too quickly, the driver feels the sensation of physical disorder, and therefore, the light distribution patterns are switched relatively moderately.

In the event that the information obtained on the forward situations indicates that a curved path exists ahead of the vehicle, the control unit may control the drive of the semiconductor light emitting devices which illuminate individually a first switching partial area and a second switching partial area of the plurality of switching partial areas which make up the light distribution pattern which results from switching so that the brightness of the first switching partial area which corresponds to an area residing in a direction in which the curved path curves is increased, while the brightness of the second switching partial area which corresponds to an area residing opposite to the area which resides in the direction in which the curved path curves is reduced. By adopting this configuration, for example, the direction of sight of the driver can be guided to the direction in which the curved path curves.

In the event that the information obtained on the driving condition of the subject vehicle indicates that the subject vehicle is running at high speeds, the control unit may control the drive of the semiconductor light emitting devices which illuminate individually a first switching partial area and a second switching partial area of the plurality of switching partial areas which make up the light distribution pattern which results from switching so that the brightness of the first switching partial area which corresponds to a central area of the resulting light distribution pattern is increased, while the brightness of the second switching partial area which corresponds to an end portion area of the resulting light distribution pattern is reduced. By adopting this configuration, the far visibility of the driver can be enhanced.

Arbitrary combinations of the constituent elements of the present invention that have been described heretofore and changing the representation of the present invention in relation to the method, apparatus and system are also effective as forms of the present invention.

According to the present invention, the sensation of physical disorder can be suppressed which would be felt by the driver in switching light distribution patterns.

DETAILED DESCRIPTION

Figure 1:
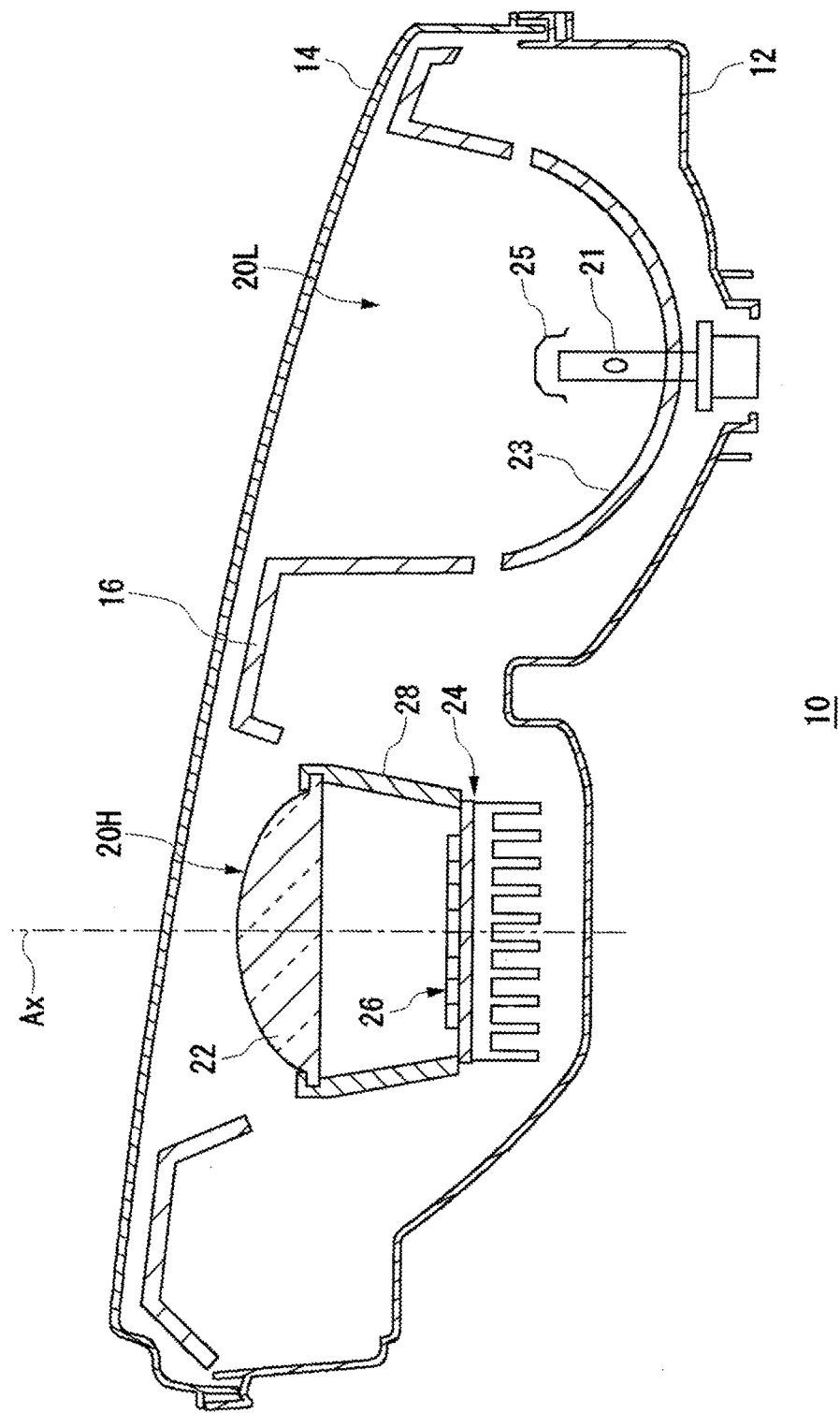
FIG. 1 is a horizontal sectional view showing a schematic construction of a vehicle lamp which includes a lamp unit used in a vehicle lamp system according to an embodiment of the present invention.

Hereinafter, referring to the drawings, the invention will be described based on a preferred embodiment. Like reference numerals will be given to like or similar constituent elements, members and processes which are shown in the accompanying drawings, and the repetition of like or similar descriptions will be omitted as required. The embodiment is not intended to limit the invention but to illustrate the invention, and thus, all characteristics that are described in the embodiment and combinations thereof are not necessarily essential to the invention.

FIG. 1 is a horizontal sectional view showing a schematic construction of a vehicle lamp which includes a lamp unit used in a vehicle lamp system according to an embodiment of the invention. A vehicle lamp 10 has a lamp body 12 and a light transmitting cover 14 which is attached to an opening portion at a front end of the lamp body 12. A low beam lamp unit 20L and a high beam lamp unit 20H are accommodated in a lamp compartment which is defined by the lamp body 12 and the light transmitting cover 14. The low beam lamp unit 20L and the high beam lamp unit 20H are mounted individually in the lamp body 12 with corresponding support members, not shown. An extension member 16 is fixed to the lamp body 12 or the light transmitting cover 14 to cover an area between the front opening portion of the lamp body 12 and the lamp units, and the extension 16 has opening portions which correspond to the areas where the lamp units exist.

The low beam lamp unit 20L is a so-called reflection-type lamp and has a light source bulb 21 and a reflector 23. The low beam lamp unit 20L forms a low beam light distribution pattern by reflecting light emitted from the light source bulb 21 to the front of the lamp by the reflector 23 and cutting off part of the reflected light with a shielding plate, not shown. A shade 25 is provided at a distal end of the light source bulb 21 to cut off light emitted directly forwards from the light source bulb 21. The construction of the low beam lamp unit 20L is not limited to this construction, and hence, a projector lamp may be used for the low beam lamp unit 20L as used for the high beam lamp unit 20H as will be described later.

The high beam lamp unit 20H is a so-called projector lamp and has a projection lens 22, a light source unit 24 including a high beam shining light source 26, and a holder 28 which holds the projection lens 22 and the light source unit 24. The projection lens 22 is a planoconvex aspheric lens for which a front surface is convex and a rear surface is plane and is disposed on an optical axis Ax which extends in a front-to-rear direction of the vehicle. A circumferential edge portion of the projection lens 22 is held at a front end side of the holder 28.

The light source unit 24 is disposed so that the light source 26 is oriented to the front in the direction of the optical axis Ax and is held at a rear end side of the holder 28. The light source unit 24 of this embodiment is made up of a plurality of LEDs which are arranged into an array-like configuration (n×m: m, n are integral numbers equal to or greater than 1). The holder 28 is attached to the lamp body 12 via a support member, not shown. The construction of the high beam lamp unit 20H is not limited to this construction and hence may be made up of a reflection-type lamp as with the low beam lamp unit 20L.

Figure 2:
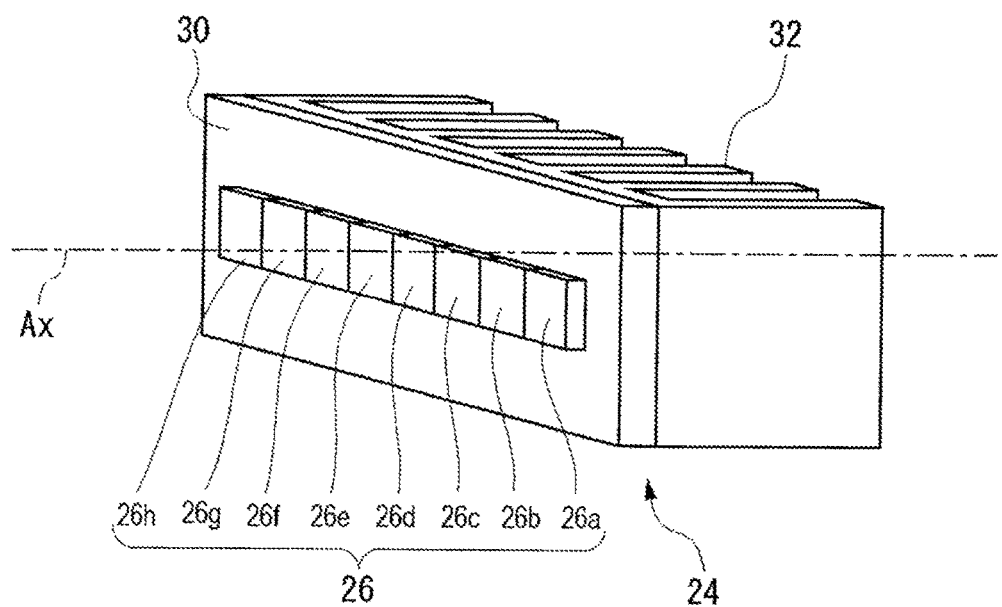
FIG. 2 is a perspective view showing a schematic construction of the lamp unit.

FIG. 2 is a perspective view showing a schematic construction of the light source unit. The light source unit 24 has the light source 26, a support plate 30 and a heat sink 32. The light source 26 has a plurality of individual light sources 26a to 26h which are made up of semiconductor light emitting devices such as light emitting diodes (LEDs), for example. The individual light sources 26a to 26h are disposed so as to be aligned in a horizontal row facing forwards while lying adjacent to one another and are fixed to a front surface of the support plate 30. In an ADB mode, which will be described later, the individual light sources 26a to 26h are controlled by a first control unit 100 and a second control unit 200 so as to emit light independently of one another. The number of individual light sources and the deposition thereof are not limited specifically. Additionally, a plurality of light emitting devices may make up one individual light source.

The heat sink 32 is a member which dissipates heat emitted from the light source 26 and is held to a surface of the support plate 30 which faces the rear of the vehicle. The light source unit 24 is fixed to the holder 28 via the support plate 30.

Figure 3:
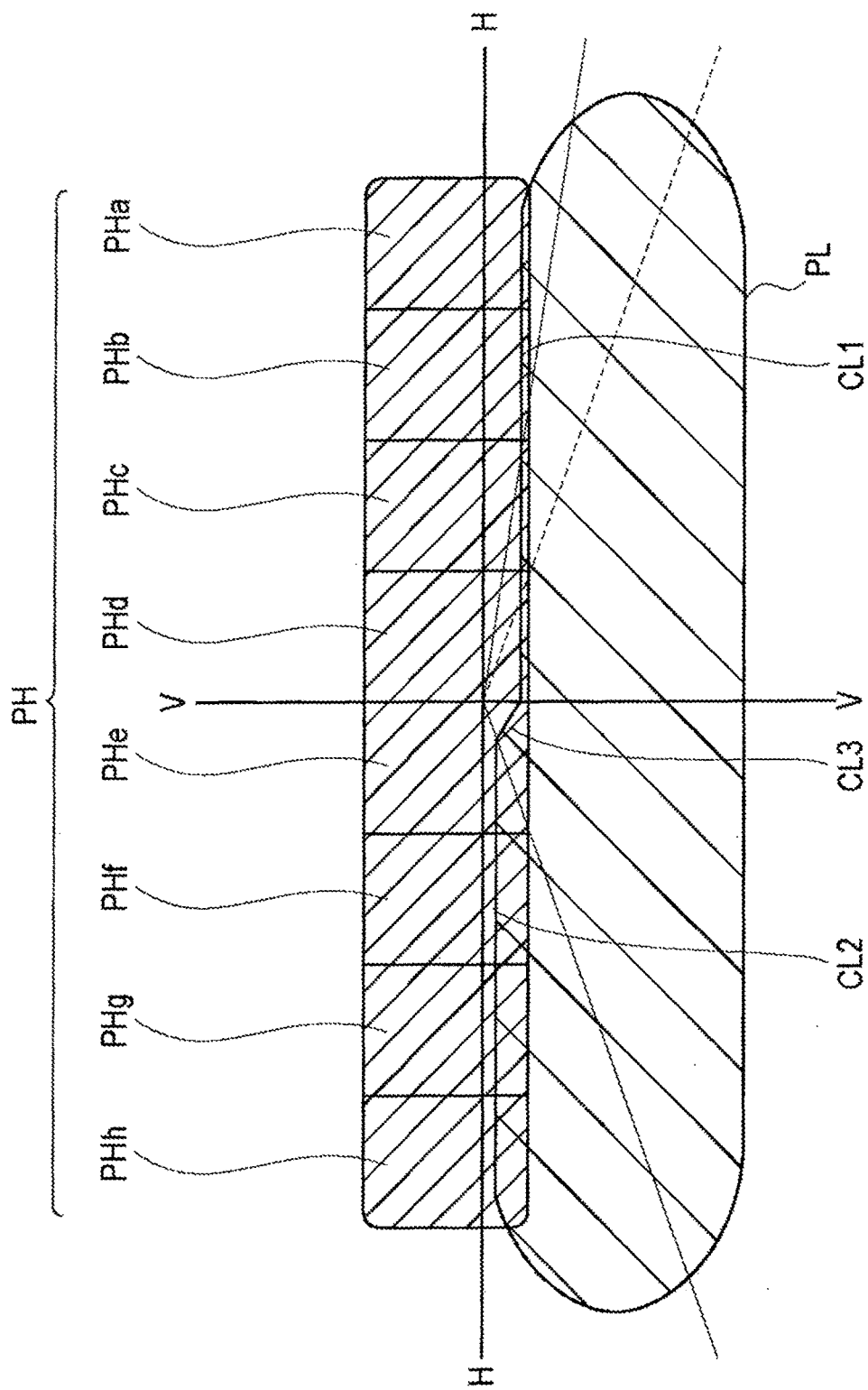
FIG. 3 is a diagram showing schematically a light distribution pattern which is formed by the vehicle lamp.

FIG. 3 is a diagram showing schematically a light distribution pattern which is formed by the vehicle lamp. FIG. 3 shows the light distribution pattern which is formed on an imaginary vertical screen located in a predetermined position ahead of the lamp, for example, a position lying 25 m ahead of the lamp.

In the vehicle lamp 10, a low beam light distribution pattern PL is formed by light emitted from the low beam lamp unit 20L. The low beam light distribution pattern PL has an oncoming vehicle's lane side cut-off line CL1 which extends parallel to a line H-H on a right side of a line V-V, a subject vehicle's lane side cut-off line CL2 which extends parallel to the line H-H in a position lying higher than the oncoming vehicle's lane side cut-off line CL1 on a left side of the line V-V, and an oblique cut-off line CL3 which is defined between the oncoming vehicle's lane side cut-off line CL1 and the subject vehicle's lane side cut-off line CL2 so as to connect them together. The low beam lamp unit 20L may form a Dover low beam light distribution pattern which is a light distribution pattern designed not to glare a driver of a preceding vehicle and pedestrians in countries where the right-hand side traffic is practiced.

In the vehicle lamp 10, a high beam light distribution pattern PH is formed by light emitted from the high beam lamp unit 20H. The high beam light distribution pattern PH is a light distribution pattern which is added to the low beam light distribution pattern PL. The high beam light distribution pattern PH is added to the low beam light distribution pattern PL so that an illumination area illuminated by the high beam lamp unit 20H is formed above the cut-off lines of the low beam light distribution pattern PL. The high beam light distribution pattern PH is a light distribution pattern into which partial patterns (partial areas) PHa to PHh which are formed by the corresponding individual light sources 26a to 26h are combined. Additionally, the high beam lamp unit 20H can form a plurality of additional light distribution patterns of different shapes by combining the partial patterns (the partial areas) PHa to PHh which are formed and not formed according to the conditions of the subject vehicle or the preceding vehicle in the ADB mode.

Namely, the high beam lamp unit 20H can form the high beam light distribution pattern PH which is made up of the plurality of partial areas (PHa to PHh) which correspond to the illumination areas illuminated individually by the plurality of semiconductor light emitting devices (the individual light sources 26a to 26h) ahead of the vehicle.

Figure 4:
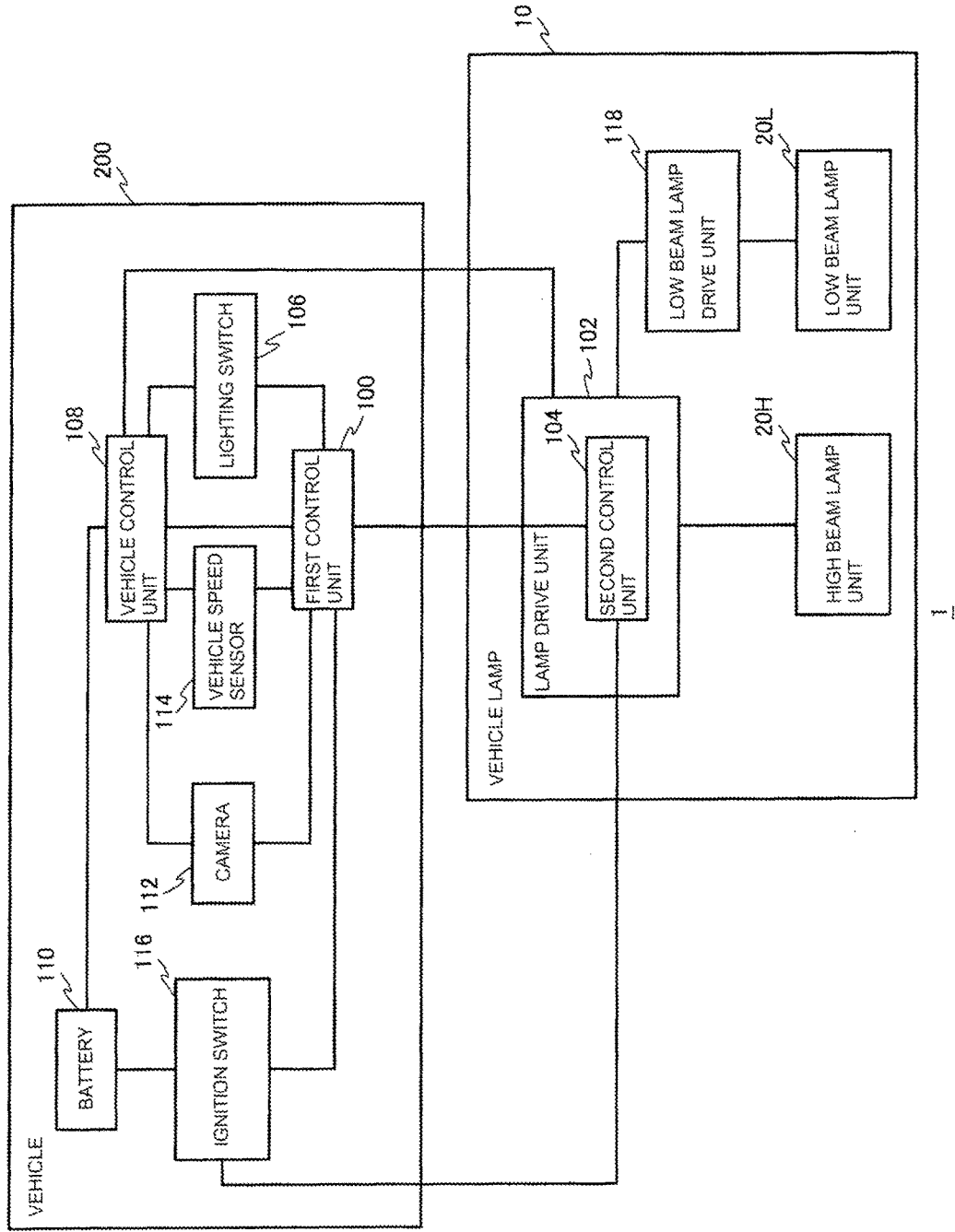
FIG. 4 is a functional block diagram which explains the configuration of the vehicle lamp system according to the embodiment.

Next, the ADB mode will be described in detail which is executed by the vehicle lamp system according to the embodiment. FIG. 4 is a functional block diagram which explains the configuration of the vehicle lamp system according to this embodiment. The first control unit 100, the second control unit 104 and a vehicle control unit 108 are realized by devices and circuits such as a CPU and a memory of a computer as a hardware configuration and are realized by programs of the computer as a software configuration. FIG. 4 depicts functional blocks which are realized by appropriate combinations of those constituent elements. It is obvious to those skilled in the art to which the invention pertains that these functional blocks can be realized by combining the hardware and the software as required.

The vehicle lamp system 1 according to the embodiment includes the high beam lamp unit 20H, the first control unit 100 which executes the ADB mode as an automatic light distribution control mode, a lamp drive unit 102 which supplies electric power to the high beam lamp unit 20H and the second control unit 104 which controls the supply of electric power from the lamp drive unit 102 to the high beam lamp unit 20H. The high beam lamp unit 20H is a lamp unit which can form a plurality of light distribution patterns having unilluminated areas which differ from one another by switching between formation and non-formation of the partial patterns PHa to PHh by switching between turning on and off of the individual light sources 26a to 26h. The high beam lamp unit 20H may switch the plurality of light distribution patterns by adjusting the illuminance of the partial patterns PHa to PHh by adjusting the luminance of the individual light sources 26a to 26h in addition to switching the light distribution patterns by switching between the turning on and off of the individual light sources 26a to 26h. The "non-formation" of the partial patterns may include forming partial patterns having illuminance which is low enough to avoid dazzling the driver of the preceding vehicle. In addition, the "unilluminated area" may include areas having such low illuminance.

The first control unit 100 is a light distribution control ECU and is disposed in the vehicle 200, for example. When a command to turn on the high beam lamp unit 20H is issued from a lighting switch 106 provided in the vehicle 200, the first control unit 100 sends a signal which commands the supply of electric power to the vehicle control unit 108 which functions as an electric power supply unit. In addition, when a command to turn off the high beam lamp unit 20H from the lighting switch 106, the first control unit 100 sends a signal which commands the stop of supplying electric power to the vehicle control unit 108.

The vehicle control unit 108 is made up of a body control module (BCM), for example. Electric power is supplied from a battery 110 which is installed in the vehicle 200 to the vehicle control unit 108, whereby the vehicle control unit 108 is driven. When receiving the signal which commands the supply of electric power from the first control unit 100, the vehicle control unit 108 supplies the electric power supplied thereto from the battery 110 to a lamp drive unit 102, and when receiving the signal which commands the stop of supplying electric power from the first control unit 100, the vehicle control unit 108 stops supplying the electric power supplied thereto from the battery 110 to the lamp drive unit 102.

In the event that a command to turn on the high beam lamp unit 20H is issued from the lighting switch 106 and that a command to execute the ADB mode is issued, the first control unit 100 executes the ADB mode. In the ADB mode, an automatic light distribution control is executed in which the formation or non-formation of the light distribution pattern is selected according to the situation of the subject vehicle or the preceding vehicle, and in the event of the light distribution pattern being formed, a light distribution pattern to be formed is selected from the plurality of light distribution patterns.

The first control unit 100 can detect the situation of the preceding vehicle including the existence of the preceding vehicle and the existing position thereof based on information which is obtained by a camera 112 which functions as a detection unit installed in the vehicle 200, for example. The camera 112 executes an image analysis of captured image data to detect a preceding vehicle within an imaging range. The camera 112 then sends the results of the analysis to the first control unit 100. Other detection devices such as an extreme high frequency radar and an infrared radar may be used in place of the camera 112 as the detection unit to detect a preceding vehicle. Alternatively, a combination of the camera and such a high frequency radar or infrared radar may be adopted. In addition, the first control unit 100 can detect the situation of the subject vehicle including whether the subject vehicle is running or stopped based on information obtained by, for example, a vehicle speed sensor 114 which is a detection unit installed in the vehicle 200.

The first control unit 100 detects the situation of the subject vehicle or the preceding vehicle by obtaining the information of the camera 112 and/or the vehicle speed sensor 114 to determine whether or not the light distribution should be formed by the high beam lamp unit 20H, and in the event that it is determined that the light distribution pattern is formed, the first control unit 100 determines on the shape of a light distribution pattern to be formed.

For example, in the event that it is determined that the subject vehicle is being stopped based on the information from the vehicle speed sensor 114, the first control unit 100 selects that the light distribution pattern by the high beam lamp unit 20H is not to be formed. Additionally, in the event that it is detected that the preceding vehicle overlaps any of illumination ranges of the partial patterns PHa to PHh based on the information of the cameral 112, the first control unit 100 selects that the light distribution pattern by the high beam lamp unit 20H is not to be formed. In the event that the first control unit 100 selects that the light distribution pattern by the high beam lamp unit 20H is not to be formed, the first control unit 100 sends a signal which signals the results of the selection (hereinafter, referred to as a "selection result signal" as required) to the second control unit 104.

In addition, for example, in the event that it is detected based on the information of the vehicle sensor 114 that the subject vehicle is traveling and that it is detected from the information of the camera 112 that the preceding vehicle does not exist in at least one of the partial patterns PHa to PHh, the first control unit 100 selects that the light distribution pattern by the high beam lamp unit 20H is to be formed. Additionally, the first control unit 100 selects as a light distribution pattern to be formed a light distribution pattern which can be obtained by the partial patterns which the preceding vehicle overlaps and which are hence not formed and the remaining partial pattern. Then, the first control unit 100 sends a selection result signal to the second control unit 104. The transmission of the selection result signal from the first control unit 100 to the second control unit 104 is executed through, for example, an LIN (Local Internet Network) communication or a CAN (Controller Area Network) communication.

In the ADB mode, the second control unit 104 controls the supply of electric power from the lamp drive unit 102 to the high beam lamp unit 20H in the electric power which is supplied from the vehicle control unit 108 to the lamp drive unit 102 based on the selection result signal which the second control unit 104 has received from the first control unit 100. Specifically speaking, the second control unit 104 determines which of the individual light sources 26a to 26h are to be fed and are not to be fed based on the results of the selection by the first control unit 100.

According to this configuration, in the event that the first control unit 100 selects that no light distribution pattern is to be formed, the lamp drive unit 102 stops supplying electric power to the high beam lamp unit 20H, so as to avoid the formation of the light distribution pattern by the high beam lamp unit 20H. On the other hand, in the event that the first control unit 100 selects that the light distribution pattern by the high beam lamp unit 20H is to be formed, the lamp drive unit 102 supplies electric power to the high beam lamp unit 20H, whereby the selected light distribution pattern is formed by the high beam lamp unit 20H. The second control unit 104 is made up of a microcontroller which is incorporated in an interior of the lamp drive unit 102, for example, and is disposed inside the vehicle lamp 10.

In the event that the lighting switch 106 issues no command to execute the ADB mode, the vehicle lamp system 1 executes a manual light distribution control mode in which a formation and a non-formation of the high beam light distribution pattern PH is switched by switching on and off the lighting switch 106 irrespective of the situation of the subject vehicle or the preceding vehicle. In the manual light distribution control mode, with a command to turn on the high beam lamp unit 20H issued, the first control unit 100 instructs the second control unit 104 to supply electric power to all the individual light sources 26a to 26h from the lamp drive unit 102.

The first control unit 100 and the second control unit 104 are connected to the battery 110 via an ignition switch 116 which is installed in the vehicle 200. Electric power is supplied and is not supplied to the first control unit 100 and the second control unit 104 from the battery 110 when the ignition switch 116 is switched on and off. Consequently, the first control unit 100 and the second control unit 108 are driven by means of electric power from a power supply (a so-called ignition power supply) which is independent of a power supply (a so-called battery power supply) for the vehicle control unit 108 which supplies lighting electric power to turn on the high beam lamp unit 20H.

When the lighting switch 106 issues a command to turn on the low beam lamp unit 20L, the first control unit 100 instructs the second control unit 104 to supply electric power from the lamp drive unit 102 to a low beam lamp drive unit 118. Electric power supplied to the low beam lamp drive unit 118 is supplied from the low beam lamp drive unit 118 to the low beam lamp unit 20L. This turns on the low beam lamp unit 20L to thereby form the low beam light distribution pattern PL.

Next, a control of the individual light sources when the ADB mode is switched between execution (the light sources are turned on) and completion (the light sources are turned off) and a control of the individual light sources when one light distribution pattern is switched to another light distribution pattern in the plurality of light distribution patterns which can be formed in the ADB mode will be described based on examples.

In the ADB mode, various light distribution patterns, including turning on and off all the individual light sources, can be formed by adjusting the luminous intensities of the plurality of individual light sources. Because of this, the individual light sources are illuminated in various forms before and after the light distribution patterns are switched, and a control is required which avoids causing the driver to feel the sensation of physical disorder when the light distribution patterns are switched as much as possible. The driver feels the sensation of physical disorder in various situations, and hence, the driver does not necessarily feel the sensation of the physical disorder only in a certain situation. However, it is assumed that the driver feels the sensation of physical disorder in the following situations.

There are raised the following situations: (1) Switching times vary or vary greatly between an instance where light distribution patterns are switched from a light distribution pattern P1 to a light distribution pattern P2 and an instance where the light distribution patterns are switched from the light distribution pattern P2 to a light distribution pattern P3; and (2) In the event that in a plurality of illumination areas which make up a light distribution pattern, there are a plurality of switching partial areas where the brightness is to be changed, timings at which the brightness (illuminance) converges to target brightness vary or vary greatly.

Example 1

Figure 5:
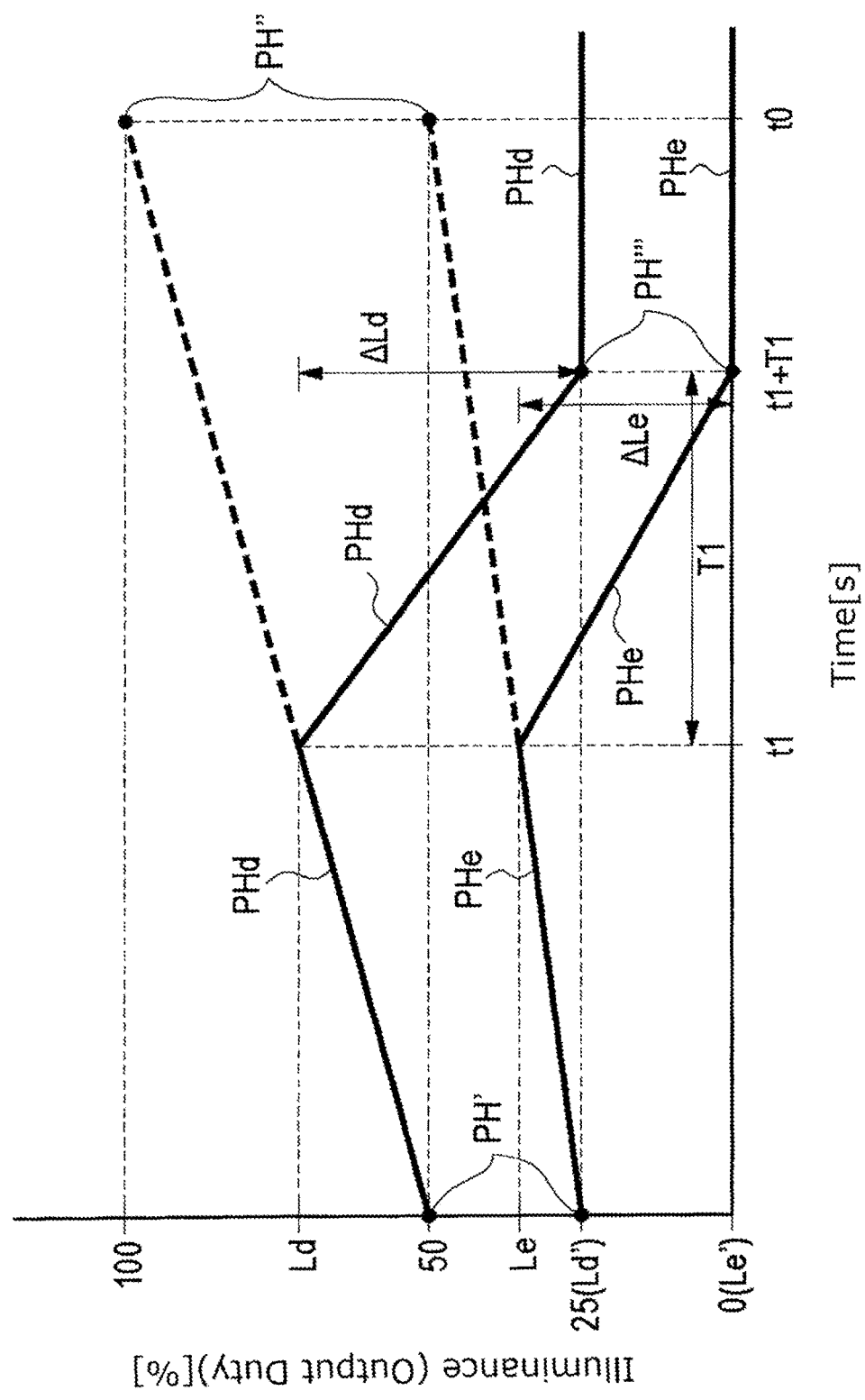
FIG. 5 is a diagram which explains a relationship between a change in illuminance and an illuminance change speed of a predetermined number of switching partial areas before and after a switching of light distribution patterns in Example 1.

In Example 1, a control will be described which will be carried out in the event that in the midst of switching a first light distribution pattern to a second light distribution pattern which are both included in a plurality of light distribution patterns, a situation is detected in which the first light distribution pattern needs to be switched to a further light distribution pattern which differs from the second light distribution pattern. FIG. 5 is a diagram explaining a relationship between illuminance change and illuminance changing speed in a predetermined number of switching partial areas before and after the light distribution patterns are switched in Example 1.

In graphs shown in FIG. 5 and FIG. 6 which will be described later, an axis of ordinates represents both the illuminance of a light source and a ratio of output duty. However, the illuminance and the output duty do not necessarily have to be in a strict proportional relationship, and hence, any light source will be adopted which has characteristics in which the illuminance gradually increases as the output duty increases.

As has been described before, the vehicle control unit 108, the first control unit 100 and the second control unit 104 (hereinafter, referred to as a "control unit" as required) according to the embodiment control the luminous intensities of the plurality of individual light sources 26a to 26h based on the information obtained on the situation of the preceding vehicle by the camera 112 and the information obtained on the driving conditions of the subject vehicle by the vehicle speed sensor 114 to thereby realize the plurality of light distribution patterns. In the following description, an instance will be described in which the luminous intensities of at least two (a plurality of) individual light sources are controlled.

In the event that the existence of a preceding vehicle (a preceding vehicle which is driven on a subject vehicle's driving lane or an oncoming vehicle which is driven on an opposite oncoming vehicle's driving lane) is detected in the partial areas PHd, PHe which make up the high beam light distribution pattern PH based on the information obtained by the camera 112, the control unit controls the high beam lamp unit 20H so as to reduce the illuminance of the partial area PHd, PHe so that the driver of the preceding vehicle is not dazzled. Specifically, as shown in FIG. 5, the control unit controls the high beam lamp unit 20H so that the output duty of electric power supplied to the individual light source 26d which illuminates the partial area PHd is reduced to 50% and the output duty of electric power supplied to the individual light source 26e which illuminates the partial area PHe is reduced to 25% so as to form a partial high beam light distribution pattern PH'.

Thereafter, for example, in a situation where the preceding vehicle disappears from the partial area PHd and the distance to the preceding vehicle is increased in the partial area PHe, the high beam lamp unit 20H controls the duties of electric power supplied to the individual light sources 26d, 26e in such a way as to increase the illuminance of the partial areas PHd, PHe to enhance the forward visibility. Specifically, as shown in FIG. 5, after a predetermined switching time t0, the control unit controls the high beam lamp unit 20H so that the output duty of electric power supplied to the individual light source 26d which illuminates the partial area PHd is increased to 100% while the output duty of electric power supplied to the individual light source 26e which illuminates the partial area PHe is increased to 50% so as to form a partial high beam light distribution pattern PH".

In this way, in the midst of switching the light distribution patterns from the partial high beam light distribution pattern PH' (the first light distribution pattern) to the partial high beam light distribution pattern PH" (the second light distribution pattern), there may be a situation in which the situation ahead of the vehicle changes greatly. For example, there occurs a situation in which the preceding vehicle re-enters the partial area PHd or the partial area PHe or a situation in which the subject vehicle approaches the preceding vehicle to reduce the distance therebetween. In the event that these situations occur at a time t1 shown in FIG. 5, in case the illuminance of the individual light sources 26d, 26e continues to be increased in the same way so as to form the partial high beam light distribution pattern PH", there is a high possibility that the occupant of the preceding vehicle is dazzled.

Then, the partial high beam light distribution pattern PH' needs to be switched to a further light distribution pattern which differs from the partial high beam light distribution pattern PH" which has been sought for until then. Although there are other various light distribution patterns as the further light distribution pattern, the high beam lamp unit 20H according to Example 1 controls the duties of the electric power supplied to the individual light sources 26d, 26e so as to reduce the illuminance of the partial areas PHd, PHe for the purpose of restricting the glare to the preceding vehicle. Specifically, as shown in FIG. 5, after a predetermined switching time t1+T1, the control unit controls the high beam lamp unit 20H so that the output duty of the electric power supplied to the individual light source 26d which illuminates the partial area PHd is reduced to 25% while the output duty of the electric power supplied to the individual light source 26e which illuminates the partial area PHe is reduced to 0% so as to form a partial high beam light distribution pattern PH'" (the further light distribution pattern).

A length of time T1 spent from the start (the time t1) of switching to the partial high beam light distribution pattern PH'" in the midst of controlling the luminous intensities of the individual light sources 26d, 26e to the completion of formation of the partial high beam light distribution pattern PH'" should be set so as to satisfy the following expression (1).

$$t1 < t1 + T1 < t0 \quad (1)$$

Namely, when switching from the partial high beam light distribution pattern PH' to the partial high beam light distribution pattern PH'" in the midst of switching from the partial high beam light distribution pattern PH' to the partial high beam light distribution pattern PH" which are both included in the plurality of light distribution patterns, in the event that in the plurality of partial areas which make up the partial high beam light distribution pattern PH'", there are switching partial areas PHd, PHe where an upward trend in illuminance is changed to a downward trend, the control unit controls the drive of the individual light sources 26d, 26e which illuminate the switching partial areas PHd, PHe so that the partial high beam light distribution pattern PH' is switched to the partial high beam light distribution pattern PH'" within the predetermined length of time T1.

In addition, in the event that switching is made to the partial high beam light distribution pattern PH" in the midst of controlling the luminous intensity of the individual light source 26d which illuminates the switching partial area PHd to realize the partial high beam light distribution pattern PH', the control unit controls the drive of the individual light source 26d so that an illuminance changing speed ΔLd of the switching partial area PHd increases according to the magnitude |Ld−Ld'| of a change in illuminance between the illuminance Ld before the brightness of the switching partial area PHd is changed and the target illuminance Ld'.

Additionally, the control unit controls the drive of the individual light source 26e which illuminates the switching partial area PHe so that an illuminance changing speed ΔLe of the switching partial area PHe increases according to the magnitude |Le−Le'| of a change in illuminance between the illuminance Le before the brightness of the switching partial area PHe is changed and the target illuminance Le'.

Namely, in the event of |Ld−Ld'|>|Le−Le'|, ΔLd>ΔLe. Because of this, the control unit controls the individual drive source which illuminates the partial switching area so that the illuminance changing speed ΔL of the switching partial area increases according to the magnitude |L*-L*'| (* is a symbol representing any of a to h) of the change in illuminance, whereby even through the change in illuminance of the switching partial area is great, the time required to switch the light distribution patterns is restricted from increasing.

By adopting this configuration, even in the event that there exist a plurality of switching partial areas where the uptrend in illuminance changes to the downtrend, the switching to the partial high beam light distribution pattern PH'" is executed within the predetermined length of time T1. Because of this, for example, even in the event that the illuminance changes differently in the plurality of switching partial areas, the timings at which the illuminance is controlled in the switching partial areas can be arranged to line up with each other. Here, the predetermined length of time T1 should be, for example, equal to or less than 1.0 s, preferably equal to or less than 0.8 s or more preferably equal to or less than 0.7 s. In this example, T1=0.4 s.

Example 2

In Example 2, as in Example 1, a control will be described which will be carried out in the event that in the midst of switching a first light distribution pattern to a second light distribution pattern which are both included in a plurality of light distribution patterns, a situation is detected in which the first light distribution pattern needs to be switched to a further light distribution pattern which differs from the second light distribution pattern. A main difference from Example 1 is that in Example 2, it is assumed that in a plurality of partial areas which make up the further light distribution pattern, there exist a plurality of switching partial areas where a downtrend in illuminance changes to an uptrend.

In the following description, the difference from Example 1 will mainly be described.

Figure 6:
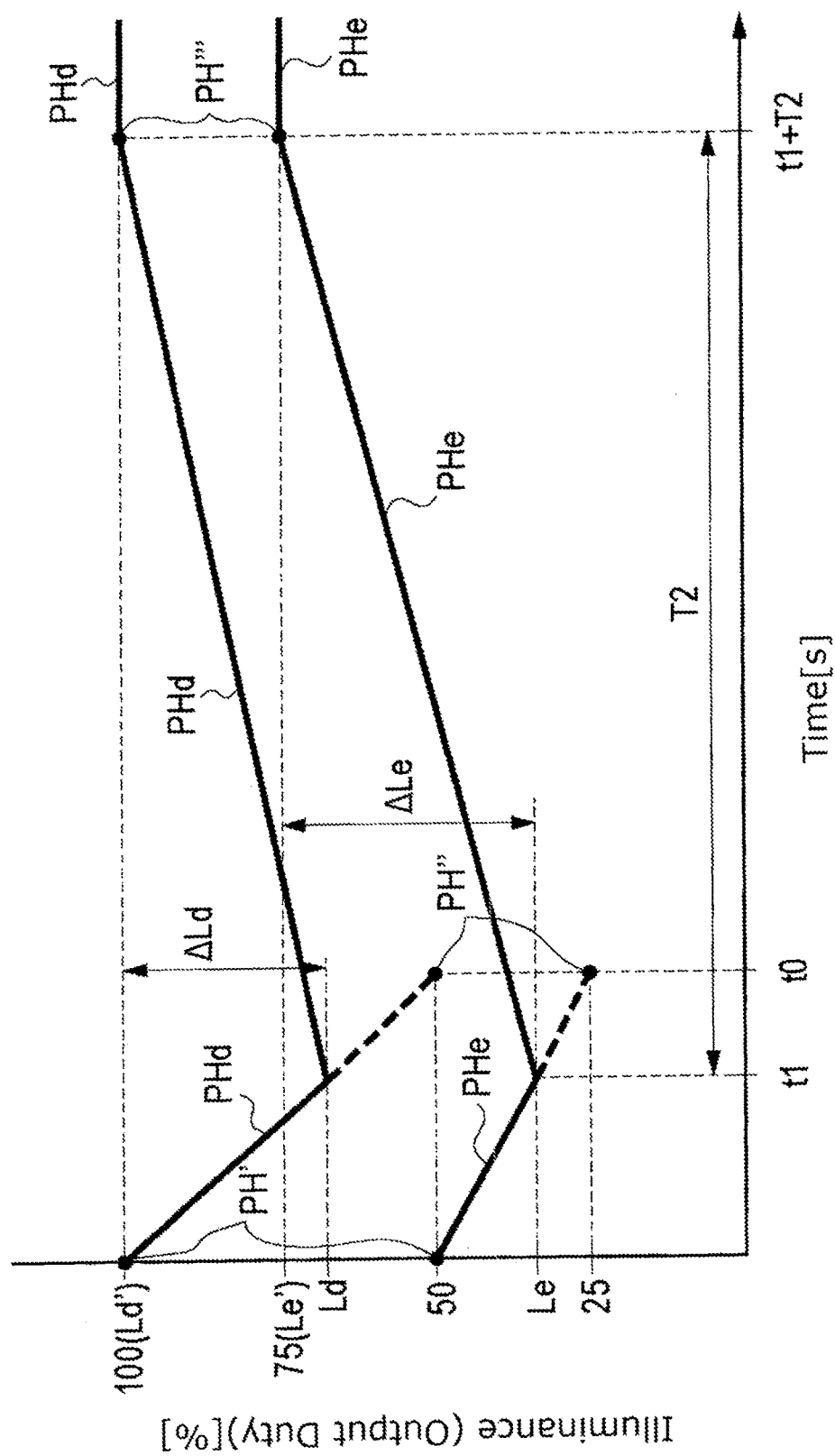
FIG. 6 is a diagram which explains a relationship between a change in illuminance and an illuminance change speed of a predetermined number of switching partial areas before and after a switching of light distribution patterns in Example 2.

FIG. 6 is a diagram explaining a relationship between illuminance change and illuminance changing speed in a predetermined number of switching partial areas before and after light distribution patterns are switched in Example 2.

For example, in the event that the existence of a preceding vehicle (a preceding vehicle which is driven on a subject vehicle's driving lane or an oncoming vehicle which is driven on an opposite oncoming vehicle's driving lane) is not detected or the preceding vehicle is detected to travel far away ahead of the subject vehicle in the partial areas PHd, PHe which make up the high beam light distribution pattern PH based on the information obtained by the camera 112, the control unit controls the high beam lamp unit 20H so as to increase the illuminance of the partial area PHd, PHe so that the forward visibility of the driver is enhanced. Specifically, as shown in FIG. 6, the control unit controls the high beam lamp unit 20H so that the output duty of electric power supplied to the individual light source 26d which illuminates the partial area PHd is increased to 100% and the output duty of electric power supplied to the individual light source 26e which illuminates the partial area PHe is increased to 50% so as to form a partial high beam light distribution pattern PH'.

Thereafter, for example, in a situation where the existence of the preceding vehicle is confirmed and the distance to the preceding vehicle is getting shorter in the partial areas PHd and the partial area PHe, the high beam lamp unit 20H controls the duties of electric power supplied to the individual light sources 26d, 26e in such a way as to reduce the illuminance of the partial areas PHd, PHe to restrict the glare to the preceding vehicle. Specifically, as shown in FIG. 6, after a predetermined switching time t0, the control unit controls the high beam lamp unit 20H so that the output duty of electric power supplied to the individual light source 26d which illuminates the partial area PHd is reduced to 50% while the output duty of electric power supplied to the individual light source 26e which illuminates the partial area PHe is reduced to 25% so as to form a partial high beam light distribution pattern PH".

In this way, in the midst of switching the light distribution patterns from the partial high beam light distribution pattern PH' (the first light distribution pattern) to the partial high beam light distribution pattern PH" (the second light distribution pattern), there may be a situation in which the situation ahead of the vehicle changes greatly. For example, there occurs a situation in which the preceding vehicle disappears from the partial area PHd or the partial area PHe or a situation in which the preceding vehicle travels away from the subject vehicle to increase the distance therebetween. For example, in the event that these situations occur at a time t1 shown in FIG. 6, in case the illuminance of the individual light sources 26d, 26e continues to be reduced in the same way so as to form the partial high beam light distribution pattern PH", the forward visibility remains deteriorated.

Then, the partial high beam light distribution pattern PH' needs to be switched to a further light distribution pattern which differs from the partial high beam light distribution pattern PH" which has been sought for until then. The high beam lamp unit 20H according to Example 2 controls the duties of the electric power supplied to the individual light sources 26d, 26e so as to increase the illuminance of the partial areas PHd, PHe for the purpose of enhancing the forward visibility ahead of the subject vehicle. Specifically, as shown in FIG. 6, after a predetermined switching time t1+T2, the control unit controls the high beam lamp unit 20H so that the output duty of the electric power supplied to the individual light source 26d which illuminates the partial area PHd is increased to 100% while the output duty of the electric power supplied to the individual light source 26e which illuminates the partial area PHe is increased to 75% so as to form a partial high beam light distribution pattern PH''' (the further light distribution pattern).

A length of time T2 spent from the start (the time t1) of switching to the partial high beam light distribution pattern PH''' in the midst of controlling the luminous intensities of the individual light sources 26d, 26e to the completion of formation of the partial high beam light distribution pattern PH''' should be set so as to satisfy the following expression (2).

$$t1 < t0 < t1 + T2 \qquad (2)$$

Namely, when switching from the partial high beam light distribution pattern PH' to the partial high beam light distribution pattern PH''' in the midst of switching from the partial high beam light distribution pattern PH' to the partial high beam light distribution pattern PH" which are both included in the plurality of light distribution patterns, in the event that in the plurality of partial areas which make up the partial high beam light distribution pattern PH''', there are switching partial areas PHd, PHe where a downward trend in illuminance is changed to an upward trend, the control unit controls the drive of the individual light sources 26d, 26e which illuminate the switching partial areas PHd, PHe so that the partial high beam light distribution pattern PH' is switched to the partial high beam light distribution pattern PH''' within the predetermined length of time T2.

In addition, in the event that switching is made to the partial high beam light distribution pattern PH" in the midst of controlling the luminous intensity of the individual light source 26d which illuminates the switching partial area PHd to realize the partial high beam light distribution pattern PH', the control unit controls the drive of the individual light source 26d so that an illuminance changing speed $\Delta Ld$ of the switching partial area PHd increases according to the magnitude $|Ld-Ld'|$ of a change in illuminance between the illuminance Ld before the brightness of the switching partial area PHd is changed and the target illuminance Ld'.

Additionally, the control unit controls the drive of the individual light source 26e which illuminates the switching partial area PHe so that an illuminance changing speed ΔLe of the switching partial area PHe increases according to the magnitude |Le−Le'| of a change in illuminance between the illuminance Le before the brightness of the switching partial area PHe is changed and the target illuminance Le'.

Namely, in the event of |Ld−Ld'|<|Le−Le'|, ΔLd<ΔLe. Because of this, the control unit controls the drive of the individual drive source which illuminates the partial switching area so that the illuminance changing speed ΔL of the switching partial area increases according to the magnitude |L*−L*'| (* is a symbol representing any of a to h) of the change in illuminance, whereby even through the change in illuminance of the switching partial area is great, the time required to switch the light distribution patterns is restricted from increasing.

By adopting this configuration, even in the event that there exist a plurality of switching partial areas where the downtrend in illuminance changes to the uptrend, the switching to the partial high beam light distribution pattern PH''' is executed within the predetermined length of time T2. Because of this, for example, even in the event that the illuminance changes differently in the plurality of switching partial areas, the timings at which the illuminance is controlled in the switching partial areas can be arranged to line up with each other. Here, the predetermined length of time T2 should be, for example, equal to or less than 3.0 s, preferably equal to or less than 2.7 s or more preferably equal to or less than 2.5 s. In this example, T2=2.4 s.

The vehicle lamp 10 according to Example 2 can also execute a similar control to that of Example 1. As this occurs, the control unit controls the drive of the semiconductor light emitting devices which illuminate the plurality of switching partial areas so that the switching to the further light distribution pattern is executed so as to satisfy the predetermined length of time T2 (T2>T1). By adopting this configuration, for example, in the event that the uptrend in illuminance is changed to the downtrend in the switching partial areas so as to restrict the occurrence of glare, the light distribution patterns are switched relatively quickly. On the other hand, for example, in the event that the downtrend in illuminance is changed to the uptrend in the switching partial areas so as to enhance the visibility, in case the illuminance controlling speed is too fast, the driver is caused to feel the sensation of physical disorder, and therefore, the light distribution patterns are switched relatively moderately.

Example 3

Figure 7:
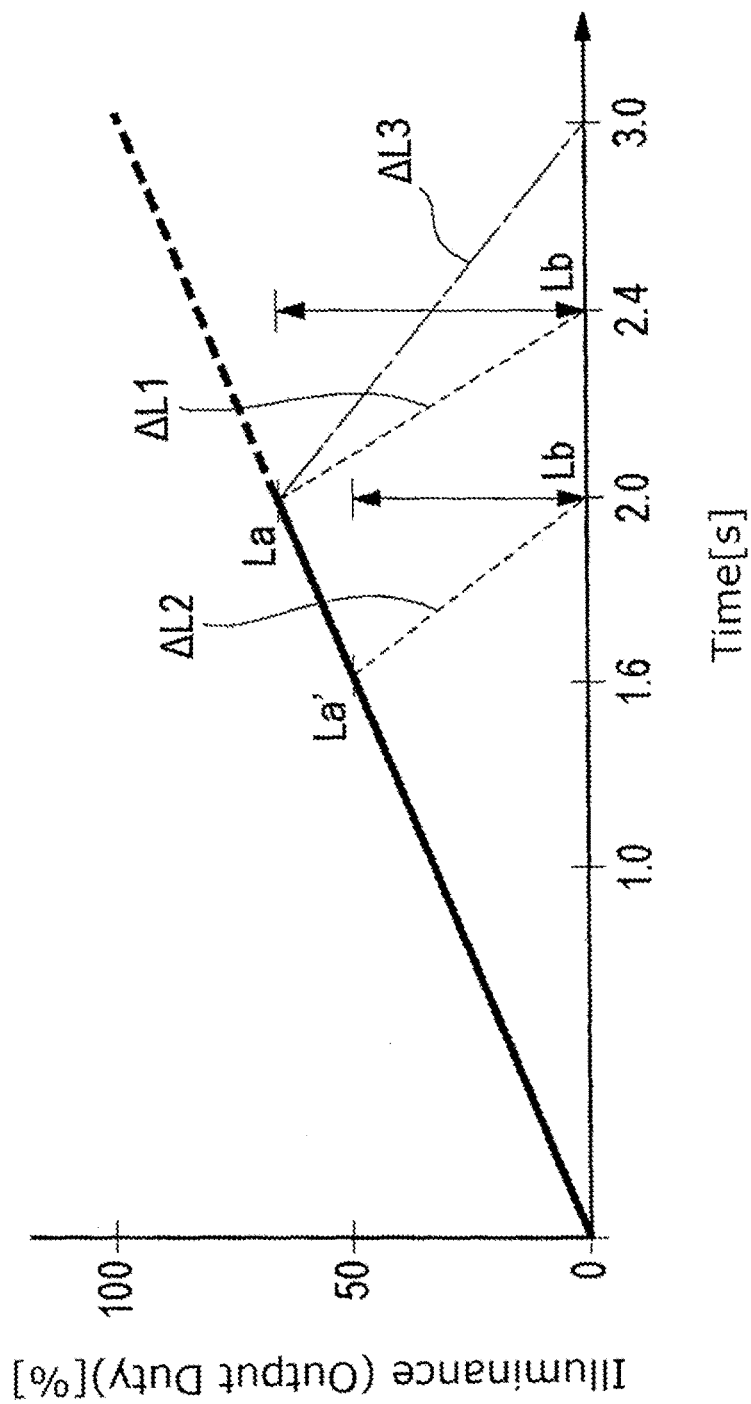
FIG. 7 is a diagram which explains a technique for making the illuminance change speed in the switching partial areas proper by a timing at which light distribution patterns are switched.

FIG. 7 is a diagram explaining a technique for making the illuminance change speed in the switching partial areas proper by a timing at which light distribution patterns are switched. In Example 3, the description of the technique will be made by paying attention one switching partial area.

For example, an instance will be described in which in a situation in which a partial high beam light distribution pattern PH2 is formed in which only the individual light source 26e is turned off since the preceding vehicle exists in the switching partial area PHe, the preceding vehicle disappears from the switching partial area PHe. In this case, the control unit starts controlling the high beam lamp unit 20H so that the output duty of electric power supplied to the individual light source 26e which illuminates the switching partial area PHe is increased to 100%. The control unit according to Example 3 controls the high beam lamp unit 20H so that the individual light source 26e which is turned off is illuminated to 100% in 3 [s].

When the preceding vehicle re-enters the switching partial area PHe in the midst of illuminating the individual light source 26e (a timing at which the time has elapsed to 2.0 in FIG. 7), the control unit changes the control of the high beam lamp unit 20H so that the output duty of electric power supplied to the individual light source 26e is reduced to 0%. Here, assuming that a control ending time (3 [s] after the start of the control) in controlling the illumination of the individual light source 26e remains unchanged, the illuminance in the individual light source 26e reduces at an illuminance changing speed ΔL3 and the individual light source 26e is finally turned off. As this occurs, since 1 [s] is taken to complete the control to turn off the individual light source 26e, the possibility of dazzling the driver of the preceding vehicle becomes high.

Then, the control unit according to Example 3 controls the drive of the individual light source 26e which illuminates the switching partial area PHe so that an illuminance changing speed ΔL1 in the switching partial area PHe increases according to the magnitude |La−Lb| of a change in illuminance between an illuminance La before the brightness of the switching partial area PHe is changed and a target illuminance Lb (0 in Example 3) irrespective of a control ending time (a time at which the control is completed) which is set when the control to turn on the individual light source 26e is started. As a result, in the control according to Example 3, a time spent from the control is switched to the control to turn off the individual light source 26e to the completion of the control to turn it off is only 0.4 [s].

Additionally, as another situation, in the event that the preceding vehicle re-enters the switching partial area PHe in the midst of turning on the individual light source 26e (a timing at which the time has elapsed to 1.6 [s] in FIG. 7), the control unit changes the control of the high beam lamp unit 20H so that the output duty of electric power supplied to the individual light source 26e is reduced to 0%.

Then, the control unit controls the drive of the individual light source 26e which illuminates the switching partial area PHe so that an illuminance changing speed ΔL2 in the switching partial area PHe increases according to the magnitude |La'−Lb| of a change in illuminance between an illuminance La' before the brightness of the switching partial area PHe is changed and the target illuminance Lb (0 in Example 3) irrespective of the control ending time (the time at which the control is completed) which is set when the control to turn on the individual light source 26e is started. As a result, even in this situation, in the control in Example 3, a time spent from the control is switched to the control to turn off the individual light source 26e to the completion of the control to turn it off is only 0.4 [s].

Additionally, in the control according to Example 3, since the time required from the start of the control to turn off the individual light source 26e which is triggered in the midst of turning it on to the completion of turning off the individual light source 26e does not vary (is restricted from varying), the risk of causing the driver to feel the sensation of physical disorder is reduced. In Example 3, the instance is described in which the control is switched to the control to turn off the individual light source 26e in the mist of turning it on. However, this technical idea can also be applied to an instance in which the control is switched to a control to turn on the individual light source 26e in the midst of turning it off. Additionally, the control to turn off the individual light source 26e includes not only an instance in which the light source is prevented from emitting light but also an instance in which the luminous intensity of the light source is reduced.

Example 4

Figure 8:
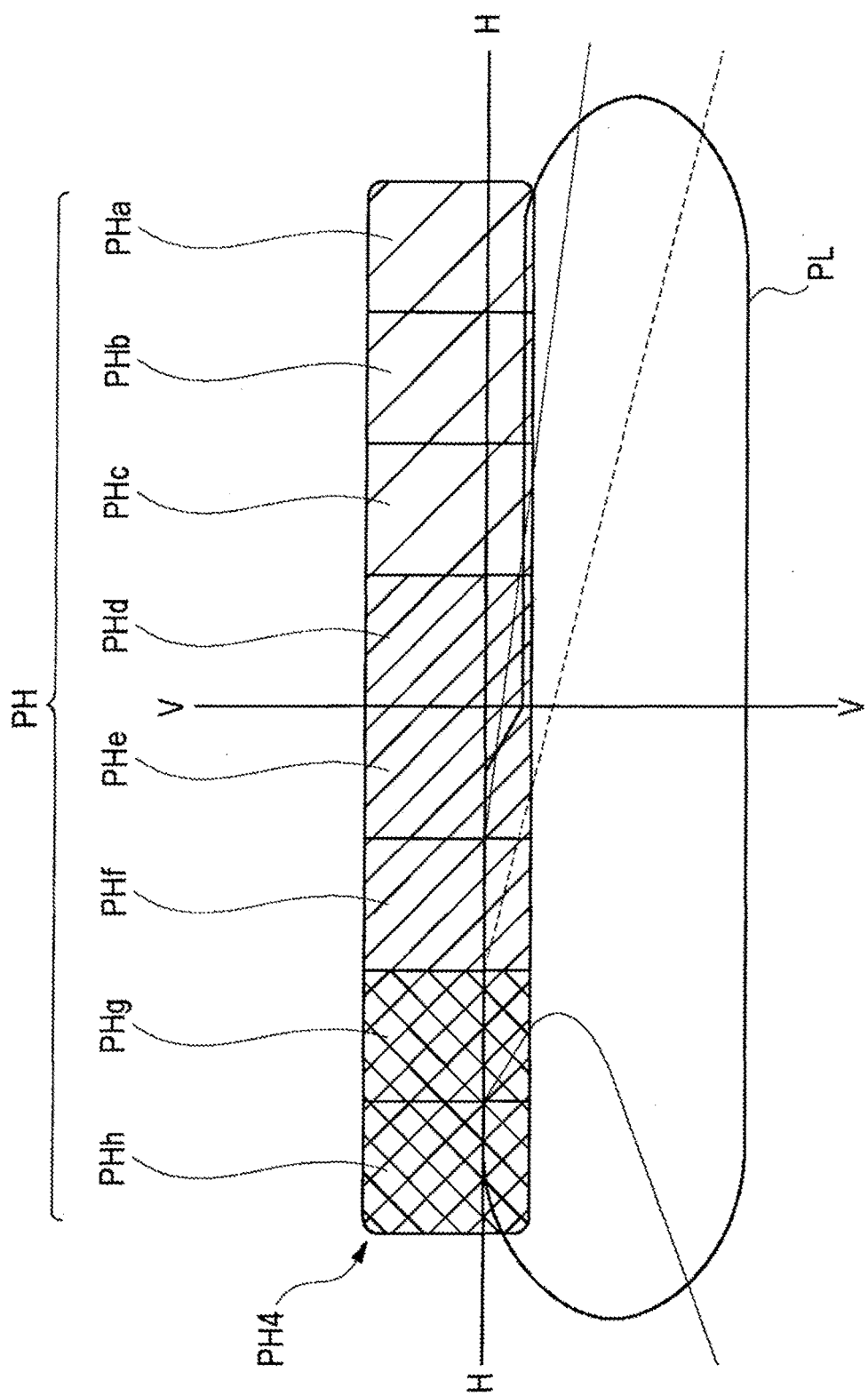
FIG. 8 is a diagram showing schematically a light distribution at a curved path.

In Example 4, a control will be described which will be carried out to switch light distribution patterns when a curved path exists ahead of the subject vehicle. FIG. 8 is a diagram showing schematically a light distribution pattern at a curved path.

In the event that the information obtained on a situation ahead of the subject vehicle by the camera 112 indicates that a curved path (a curve) exists ahead of the subject vehicle, the control unit controls the high beam lamp unit 20H so as to switch a normal high beam light distribution pattern PH1 which has been used until then to a curved path light distribution pattern PH4. Then, the control unit controls the drive of the individual light sources 26g, 26h and the individual light sources 26a to 26c which illuminate, in a plurality of switching areas (PHa, PHb, PHc, PHg, PHh) which make up the curved path light distribution pattern PH4, first switching partial areas PHg, PHh which correspond to a left area which exists in a direction in which the curved path curves and second switching partial areas PHa, PHb, PHc which correspond to a right area which lies on an opposite side to the area which exists in the direction in which the curved path curves, respectively, so that the brightness of the left area is increased and the brightness of the right area is reduced.

Figure 9A:
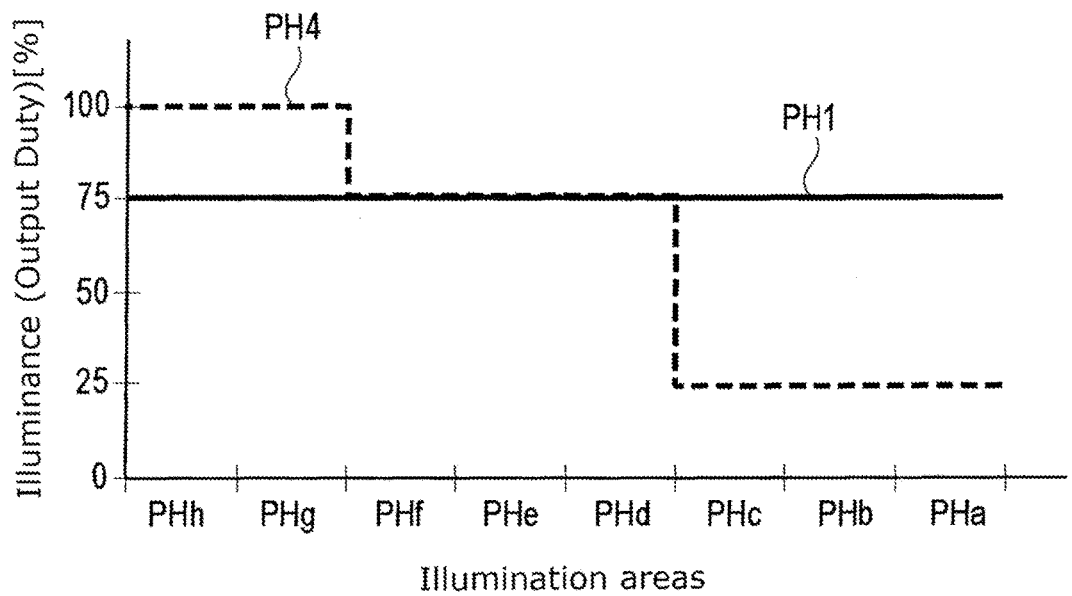
FIG. 9A is a diagram showing an illuminance change in switching partial areas where the brightness is changed by switching from a high beam light distribution pattern PH1 to a curved path light distribution pattern PH4.
Figure 9B:
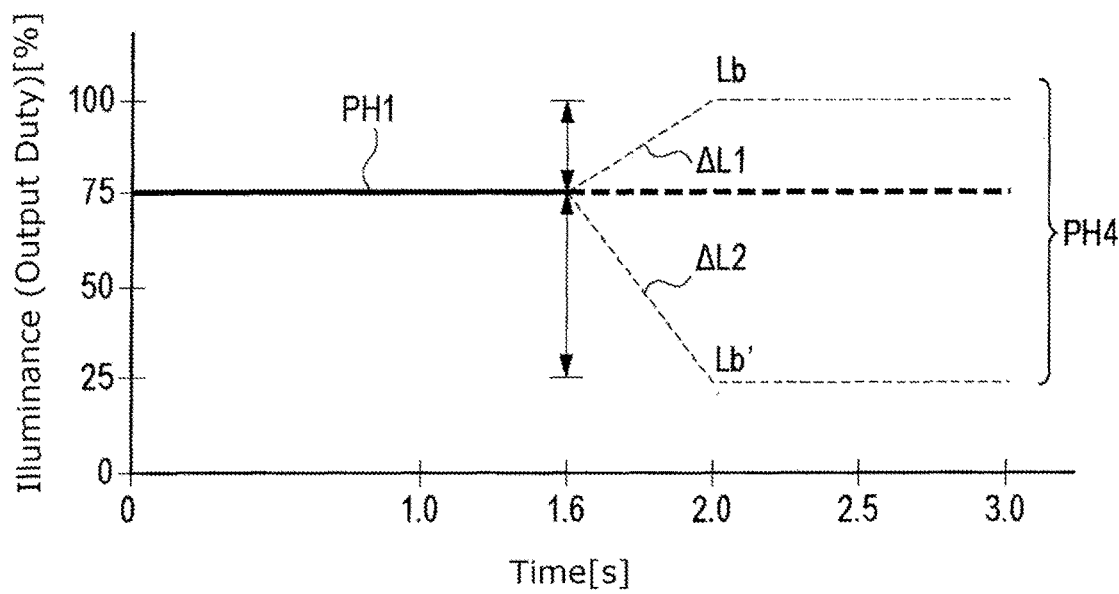
FIG. 9B is a diagram explaining a relationship between illuminance change and illuminance changing speed in the switching partial areas in switching to the curved path light distribution pattern PH4 according to Example 4.

FIG. 9A is a diagram showing a change in illuminance in the switching partial areas where the brightness is changed as a result of switching from the high beam light distribution pattern PH1 to the curved path light distribution pattern PH4. FIG. 9B is a diagram explaining a relationship between illuminance change and illuminance changing speed in the switching partial areas in switching to the curved path light distribution pattern PH4 according to Example 4.

In such a state that the high beam light distribution pattern PH1 is formed, in the event that it is detected based on the information obtained by the camera 112 that a curved path exists ahead of the subject vehicle, the control unit controls the high beam lamp unit 20H so that the output duty of electric power supplied to the individual light sources 26g, 26h which illuminate the switching partial areas PHg, PHh is increased from 75% which is used until then to 100% (an increase) and the output duty of electric power supplied to the individual light sources 26a to 26c which illuminate the switching partial areas PHa to PHc is reduced from 75% which is used until then to 25% (a reduction). As a result, the curved path light distribution pattern PH4 is formed in which as shown in FIG. 9, the left area which lies in the direction in which the curved path curves becomes bright while the right area which lies opposite to the left area which lies in the direction in which the curved path curves becomes dark, whereby the direction of sight of the driver can be guided, for example, to the direction in which the curved path curves.

In the event that the high beam light distribution pattern PH1 is switched to the curved path light distribution pattern PH4, the control unit controls the drive of the individual light sources 26g, 26h which illuminate the first switching partial areas PHg, PHh so that an illuminance changing speed ΔL1 in the first switching partial areas PHg, PHh increases according to the magnitude |La−Lb| of a change in illuminance between an illuminance La before the brightness of the first switching partial areas PHg, PHh is changed and a target illuminance Lb as shown in FIG. 9B. At the same time, the control unit controls the drive of the individual light sources 26a to 26c which illuminate the switching partial areas PHa to PHc so that an illuminance changing speed ΔL2 in the second switching partial areas PHa to PHc increases according to the magnitude |La−Lb'| of a change in illuminance between an illuminance La before the brightness of the second switching partial areas PHa to PHc is changed and a target illuminance Lb'.

Then, the control unit controls the drive of the individual light sources 26a to 26c and the individual light sources 26g, 26h which illuminate the second switching partial areas PHa to PHc and the first switching partial areas PHg, PHh, respectively, based on the illuminance changing speeds ΔL1, ΔL2. This restricts the time required until the illuminance change converges (completes) in the first switching partial areas PHg, PHh and the time required until the illuminance change converges (completes) in the second switching partial areas PHa to PHc from varying, whereby the occurrence of a situation can be prevented in which the convergence of the illuminance change is delayed (put forward) in some partial areas of the light distribution pattern.

Example 5

Figure 10:
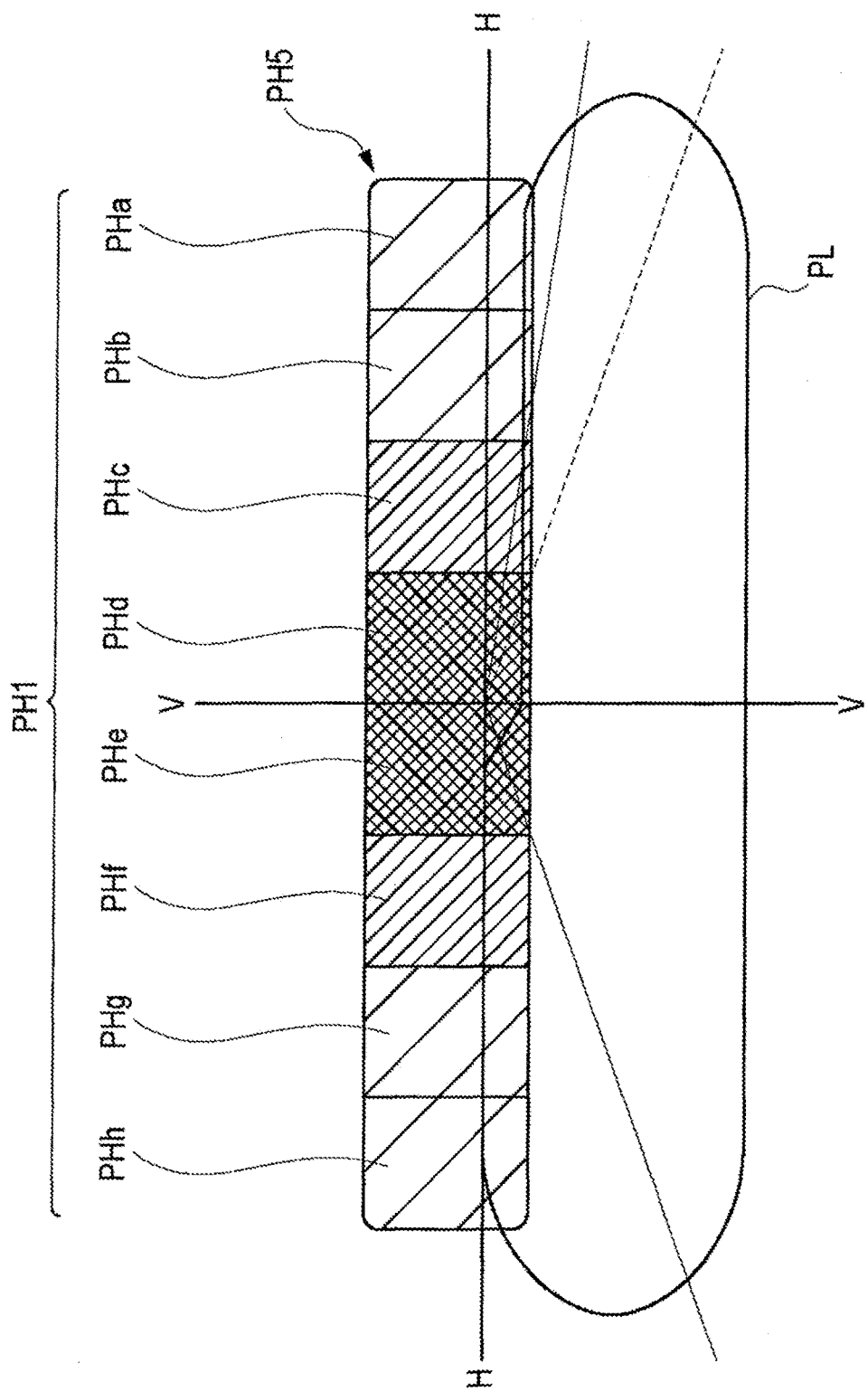
FIG. 10 is a diagram showing schematically a high speed running light distribution pattern.

In Example 5, a control will be described in which light distribution patterns are switched to enhance a far-field visibility during high-speed driving. FIG. 10 is a diagram showing schematically a high-speed driving light distribution pattern.

In the event that the information obtained on the driving conditions of the subject vehicle by the vehicle speed sensor 114 indicates that the subject vehicle is being driven at high speeds, the control unit controls the high beam lamp unit 20H so that the normal high beam light distribution pattern PH1 which has been used until then is switched to a highs-speed driving light distribution pattern PH5. Then, the control unit controls the drive of the individual light sources 26a, 26b, 26d, 26e, 26g, 26h) which illuminate first switching partial areas PHd, PHe and second switching partial areas PHa, PHb, PHg, PHh of a plurality of switching partial areas (PHa, PHb, PHd, PHe, PHg, PHh) which make up the high-speed driving light distribution pattern PH5 so that the brightness of the first switching partial areas PHd, PHe which correspond to a central area of the high-speed driving light distribution pattern PH5 is increased and the brightness of the second switching areas PHa, PHb, PHg, PHh which correspond to end portion areas of the high-speed driving light distribution pattern PH5 is reduced, whereby the far-field visibility can be enhanced.

Thus, the invention has been described by reference to the embodiment and the examples. However, the invention is not limited to the embodiment and the examples, and hence, forms made by combining or replacing the configurations of the embodiment and the examples as required are also included in this invention. Additionally, it is also possible to change the combinations and the orders of the processes in the embodiment and the examples as required based on the knowledge of those skilled in the art to which the invention pertains or to make various modifications including design changes to the embodiment and the examples, and embodiments to which such modifications are made can also be included in the scope of the invention.

The relationship between the illuminance changing speed and the magnitude of the illuminance change may be not only a proportional relationship which is represented by a linear function but also a relationship which is represented by a quadratic function a cubic function or an exponential function. The relationship between the illuminance changing speed and the magnitude of the illuminance change may be stored as a function or stored as a table in a storage unit provided in the vehicle lamp system.

DESCRIPTION OF REFERENCE NUMERALS AND CHARACTERS

1: vehicle lamp system; 10: vehicle lamp; 20H: high beam lamp unit; 20L: low beam lamp unit; 24: light source unit; 26: light source; 100: first control unit; 102: lamp drive unit; 104: second control unit; 108: vehicle control unit; 112: camera; 114: vehicle speed sensor; PH1: high beam light distribution pattern; PH2: partial high beam light distribution pattern; PH4: curved path light distribution pattern; PH5: high-speed driving light distribution pattern; T1: predetermined length of time; T1: time; T2: predetermined length of time; T2, t1: time.

The invention claimed is:

1. A vehicle lamp system comprising:
a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle; and
a control unit configured to control the plurality of semiconductor light emitting devices so as to change their luminous intensities based on information obtained on forward situations or information obtained on a driving condition of the subject vehicle to thereby realize a plurality of light distribution patterns, wherein
in a midst of switching the plurality of light distribution patterns from a first light distribution pattern to a second light distribution pattern which are both included in the plurality of light distribution patterns, in the event that a situation is detected in which the first light distribution pattern needs to be switched to a third light distribution pattern which differs from the second light distribution pattern, and
in switching from the second light distribution pattern to the third light distribution pattern, in the event that in the plurality of partial areas which make up the third light distribution pattern, there exist a plurality of switching partial areas where an upward trend in illuminance changes to a downward trend,
the control unit controls the drive of the semiconductor light emitting devices which illuminate the plurality of switching partial areas so that the switching to the third light distribution pattern can be executed within a predetermined length of time (T1).

2. The vehicle lamp system according to claim 1, wherein in the event that the information obtained on the forward situations indicates that a curved path exists ahead of the vehicle, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to an area residing in a direction in which the curved path curves is increased, while the brightness of the second switching partial area which corresponds to an area residing opposite to the area which resides in the direction in which the curved path curves is reduced.

3. The vehicle lamp system according to claim 1, wherein in the event that the information obtained on the driving condition of the subject vehicle indicates that the subject vehicle is running at high speeds, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to a central area of the resulting light distribution pattern is increased, while the brightness of the second switching partial area which corresponds to an end portion area of the resulting light distribution pattern is reduced.

4. A vehicle lamp system comprising:
a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle; and
a control unit configured to control the plurality of semiconductor light emitting devices so as to change their luminous intensities based on information obtained on forward situations or information obtained on a driving condition of the subject vehicle to thereby realize a plurality of light distribution patterns, wherein
in a midst of switching the plurality of light distribution patterns from a fourth light distribution pattern to a fifth light distribution pattern which are both included in the plurality of light distribution patterns, in the event that a situation is detected in which the fourth light distribution pattern needs to be switched to a sixth light distribution pattern which differs from the fifth light distribution pattern, and
in switching from the fifth distribution pattern to the sixth light distribution pattern, in the event that in the plurality of partial areas which make up the sixth light distribution pattern, there exist a plurality of switching partial areas where a downward trend in illuminance changes to an upward trend,
the control unit controls the drive of the semiconductor light emitting devices which illuminate the plurality of switching partial areas so that the switching to the sixth light distribution pattern, there exist a plurality of switching partial areas where a downward trend in illuminance changes to an upward trend,
the control unit controls the drive of the semiconductor light emitting devices which illuminated the plurality of switching to the sixth light distribution pattern can be executed within a predetermined length of time (T2).

5. The vehicle lamp system according to claim 4, wherein in the event that the information obtained on the forward situations indicates that a curved path exists ahead of the vehicle, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to an area residing in a direction in which the curved path curves is increased, while the brightness of the second switching partial area which corresponds to an area residing opposite to the area which resides in the direction in which the curved path curves is reduced.

6. The vehicle lamp system according to claim 4, wherein in the event that the information obtained on the driving condition of the subject vehicle indicates that the subject vehicle is running at high speeds, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to a central area of the resulting light distribution pattern is increased, while the brightness of the second switching partial area which corresponds to an end portion area of the resulting light distribution pattern is reduced.

7. A vehicle lamp system comprising:
- a lamp unit having a plurality of semiconductor light emitting devices which are arranged into an array-like configuration and configured to form a light distribution pattern which is made up of a plurality of partial areas which correspond individually to the plurality of semiconductor light emitting devices ahead of a vehicle; and
- a control unit configured to control the plurality of semiconductor light emitting devices so as to change their luminous intensities based on information obtained on forward situations or information obtained on a driving condition of the subject vehicle to thereby realize a plurality of light distribution patterns, wherein
- (1) in a midst of switching the plurality of light distribution patterns from a first light distribution pattern to a second light distribution pattern which are both included in the plurality of light distribution patterns, in the event that a situation is detected in which the first light distribution pattern needs to be switched to a third light distribution pattern which differs from the second light distribution pattern, and
- in switching from the second light distribution pattern to the third light distribution pattern, in the event that in the plurality of partial areas which make up the third light distribution pattern, there exist a plurality of switching partial areas where an upward trend in illuminance changes to a downward trend,
- the control unit controls the drive of the semiconductor light emitting devices which illuminate the plurality of switching partial areas so that the switching to the third light distribution pattern can be executed within a first predetermined length of time (T1), and wherein
- (2) in a midst of switching the plurality of light distribution patterns from a fourth light distribution pattern to a fifth light distribution pattern which are both included in the plurality of light distribution patterns, in the event that a situation is detected in which the fourth light distribution pattern needs to be switched to a sixth light distribution pattern which differs from the fifth light distribution pattern, and
- in switching from the fifth light distribution pattern to the sixth light distribution pattern, in the event that in the plurality of partial areas which make up the sixth light distribution pattern, there exist a plurality of switching partial areas where a downward trend in illuminance changes to an upward trend,
- the control unit controls the drive of the semiconductor light emitting devices which illuminate the plurality of switching partial areas so that the switching to the sixth light distribution pattern can be executed within a second predetermined length of time (T2) ((T2)>(T1)).

8. The vehicle lamp system according to claim 7, wherein in the event that the information obtained on the forward situations indicates that a curved path exists ahead of the vehicle, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to an area residing in a direction in which the curved path curves is increased, while the brightness of the second switching partial area which corresponds to an area residing opposite to the area which resides in the direction in which the curved path curves is reduced.

9. The vehicle lamp system according to claim 7, wherein in the event that the information obtained on the driving condition of the subject vehicle indicates that the subject vehicle is running at high speeds, the control unit controls the drive of the semiconductor light emitting devices which illuminate individually a first switching partial area and a second switching partial area of the plurality of switching partial areas which make up the light distribution pattern which results from switching so that the brightness of the first switching partial area which corresponds to a central area of the resulting light distribution pattern is increased, while the brightness of the second switching partial area which corresponds to an end portion area of the resulting light distribution pattern is reduced.

* * * * *